United States Patent [19]
Arth et al.

[11] 3,821,374
[45] June 28, 1974

[54] CHEMICAL COMPOSITIONS

[75] Inventors: Geln E. Arth, Cranford; Lewis H. Sarett, Princeton; Arthur A. Patchett, Cranford, all of N.J.

[73] Assignee: Merck & Co., Inc., Rahway, N.J.

[22] Filed: July 18, 1972

[21] Appl. No.: 272,837

Related U.S. Application Data

[63] Continuation of Ser. No. 68,028, Aug. 28, 1970.

[52] U.S. Cl............ 424/238, 260/397.3, 260/397.5
[51] Int. Cl. ................................................. C07c
[58] Field of Search.................. 260/397.3, 397.5

[56] References Cited
UNITED STATES PATENTS

| | | | |
|---|---|---|---|
| 2,655,519 | 10/1953 | Schmidt-Thome............ | 260/397.5 |
| 3,155,690 | 11/1964 | Cole............................. | 260/397.3 |

OTHER PUBLICATIONS

Joska et al., Coll. Czech, Chem Comm. 21, (1956) pg. 754–760, pages 754–755 relied on.

El-Tayeb et al., "Biochem. Biophys. Acta 93", (1964) pages 411–417, p. 414 relied on.

*Primary Examiner*—Elbert L. Roberts
*Attorney, Agent, or Firm*—James A. Arno; Harry E. Westlake, Jr.; Rudolph J. Anderson, Jr.

[57] ABSTRACT

The invention disclosed herein relates to novel steroid compositions and, more particularly, to compositions effective as androgen biosynthesis inhibitors and containing 3-oxygenated-17-acylamido-steroids of the androstane series. The new compositions, comprising 3-oxygenated-17-acylamidoandrostanes and unsaturated derivatives, are extremely active in lowering the biosynthesis of testicular androgens which can stimulate over development of sebaceous glands with resultant acne and which are often productive of prostatic enlargement.

7 Claims, No Drawings

CHEMICAL COMPOSITIONS

This is a continuation of application Ser. No. 68,028, filed Aug. 28, 1970.

These 3-oxygenated-17-acylamido-androstanes and unsaturated derivatives, steroid component of the new compositions subject of the present invention, include compounds having the following chemical formula:

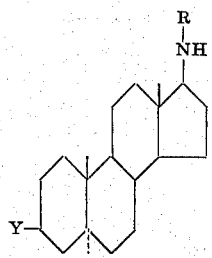

and $\Delta^4$-dehydro, $\Delta^{1,4}$-bis-dehydro and $\Delta^5$-dehydro derivatives thereof; where R is acetyl or formyl; and Y is hydroxy or lower alkanoyloxy in the case of androstanes and $\Delta^5$-androstenes, and keto in the case of $\Delta^4$-androstenes and $\Delta^{1,4}$-androstadienes; as for example, 17-acetamido-androst-4-ene-3-one; 17-acetamido-androsta-1,4-diene-3-one; 3-hydroxy-17-acetamido-androstane; 3-acetoxy-17-acetamido-androstane; 3-hydroxy-17-acetamido-androst-5-ene; 3-acetoxy-17-acetamido-androst-5-ene; 3-hydroxy-17-formamido-androst-5-ene; 3-formyloxy-17-formamido-androst-5-ene; 17-formamido-androst-4-ene-3-one, and the like.

The compositions containing these 3-oxygenated-17-acylamido-androstanes and unsaturated derivatives comprise the steroid compound in admixture with a pharmacologically acceptable solid or liquid carrier, and are prepared for administration in convenient dosage forms such as pills, tablets, capsules, syrups for oral uses, or in a liquid form adapted for administration of steroid hormones by injection; microcrystalline aqueous suspensions or oil-in-water emulsions can be prepared for parenteral dosage.

The 3-oxygenated-17-acylamido-androstanes and unsaturated derivatives, used in making our novel compositions, are conveniently prepared by reacting pregnenolone 3-acetate with hydroxylamine to form 3-acetoxy-20-oximino-pregn-5-ene which is then reacted with phosphorous oxychloride in pyridine to form 3-acetoxy-17-acetamido-androst-5-ene; the latter compound is hydrolyzed under mildly alkaline conditions to form 3-hydroxy-17-acetamido-androst-5-ene. Hydrolysis of this 3-hydroxy-17-acetamido-androst-5-ene with an aqueous alkali such as sodium hydroxide or alternatively, of the 3-acetoxy-17-acetamido-androst-5-ene results in the formation of 3-hydroxy-17-amino-androst-5-ene which, upon reaction with formic acid, is converted to 3-formyloxy-17-formamido-androst-5-ene; if desired, the latter compound may be reacted with aqueous bicarbonate to produce 3-hydroxy-17-formamido-androst-5-ene. The 3-(hydroxy or formyloxy)17-(acetamido or formamido) androst-5-ene is oxidized, preferably by the Oppenauer method using cyclohexanone in the presence of aluminum isopropoxide, thereby forming 17-(acetamido or formamido)androst-4-ene-3-one; the latter is reacted with dichloro-dicyano-benzoquinone to produce 17-(acetamido or formamido)androsta-1,4-diene-3-one.

The reaction between pregnenolone 3-acetate and hydroxylamine is conveniently carried out by heating the reactants together with sodium acetate in aqueous methanolic solution under reflux. The reaction solution is diluted with water, and the insoluble material is recovered by filtration and dried to give 3-acetoxy-20-oximino-pregn-5-ene.

The rearrangement of this oxime is conveniently carried out by adding a pyridine solution of phosphorous oxychloride to a cold mixture of the 3-acetoxy-20-oximino-pregn-5-ene and pyridine at a rate such that the temperature is maintained at approximately −15°C. to −10°C. The resulting mixture is then stirred for an additional period of approximately 3 hours at about 0°C., and the creamy reaction mixture is poured slowly into ice. The precipitate, which forms, is recovered by filtration and dried to give 3-acetoxy-17-acetamido-pregn-5-ene.

The selective hydrolysis of the 3-acetoxy substituent, without substantially affecting the 17-acetamido grouping, may be conducted by heating a mixture of the 3-acetoxy-17-acetamido-pregn-5-ene and aqueous ethanolic potassium bicarbonate under reflux for a period of approximately 15 hours, at the end of which time the hydrolysis reaction is ordinarily substantially complete. The ethanol is evaporated from the reaction solution under reduced pressure until a precipitate appears. Water is then added to the aqueous mixture, and the precipitate which forms is recovered by filtration, washed with water, and dried to give 3-hydroxy-17-acetamido-pregn-5-ene.

The hydrolysis of the 3-(hydroxy or acetoxy)-acetamido-androst-5-ene with aqueous alkali, is ordinarily carried out by adding an aqueous solution of an alkali metal hydroxide, such as sodium hydroxide, to an ethanolic solution of the steroid, and heating the resulting mixture at an elevated temperature up to about 180°C. under pressure, while maintaining the reactants under a nitrogen atmosphere. The reaction solution is filtered, and the filtered solution is evaporated to a syrup under reduced pressure. This syrup is conveniently purified by extracting it with a mixture of chloroform and water, and treating the chloroform layer, after drying, with hydrogen chloride thereby precipitating the 3-hydroxy-17-amino-androst-5-ene in the form of its hydrochloride salt.

The reaction of this 3-hydroxy-17-amino-androst-5-ene with formic acid is conveniently carried out by heating the reactants together thereby forming 3-formyloxy-17-formamido-androst-5-ene, which is conveniently recovered from the reaction solution by evaporation under reduced pressure; the reaction of the latter compound with aqueous bicarbonate is carried out in aqueous methanol thereby forming the 3-hydroxy-17-formamido-androst-5-ene.

The Oppenauer oxidation is ordinarily conducted by forming a dry solution of the 3-hydroxy-17-(acetamido or formamido)-androst-5-ene, and cyclohexanone in benzene, and adding thereto an excess of aluminum isopropoxide. The resulting mixture is heated under reflux under which conditions the reaction is ordinarily complete in about 3 hours. The reaction solution is ordinarily buffered by addition of a saturated Rochelle salt solution, and the resulting mixture is subjected to steam distillation thereby distilling the cyclohexanone and other volatile organic compounds therefrom. The aqueous mixture is extracted with a water immiscible solvent such as chloroform, and the chloroform solution is washed, dried, and evaporated to dryness under reduced pressure. The residual material is purified by crystallization from chloroform-ethyl acetate to give substantially pure 17-(acetamido or formamido)-androst-4-ene-3-one.

The reaction of this last-named compound with dichloro-dicyano-benzoquinone is carried out by bringing the reactants together in dioxane, and heating the resulting mixture under reflux in a nitrogen atmosphere under which conditions the dehydrogenation reaction is substantially complete in about 3 hours. Ethyl acetate is added to the reaction mixture to ensure solution of the product, and the resulting mixture is filtered. The filtered solution is washed with aqueous sodium hydroxide solution, then with water, dried, and evaporated under reduced pressure to give 17-(acetamido or formamido)-androsta-1,4-diene-3-one.

The following examples illustrate methods of preparing the steroid components of the novel biosynthesis-inhibiting compositions subject to the present invention, but it is to be understood that these examples are given for purposes of illustration and not of limitation.

EXAMPLE 1

A solution containing about 54 g. of hydroxylamine hydrochloride and 120 g. of sodium acetate trihydrate dissolved in 200 ml. of water is added with stirring, over a period of approximately 5 minutes, to a solution of 110 g. of 3-acetoxy-pregn-5-ene-20-one in 2600 ml. of methanol. Shortly after addition, a precipitate forms; the resulting mixture is heated under reflux for a period of approximately 2 hours, and the reaction mixture is cooled. 600 ml. of water is added, and the material which precipitates is recovered by filtration, washed with water, and dried to give about 119 g. of 3-acetoxy-20-oximino-pregn-5-ene; m.p. 195°C.

This 119 g. of 3-acetoxy-20-oximino-pregn-5-ene is partially dissolved in 200 ml. of pyridine, and the resulting mixture is cooled to about −10°C. A solution of 100 ml. of phosphorus oxychloride in 200 ml. pyridine is then added to this mixture at such a rate as to maintain the temperature between −15°C. and −10°C. The resulting mixture is stirred for an additional period of approximately 3 hours at a temperature of about 0°C., and the creamy reaction mixture is poured slowly onto ice. The material which precipitates is recovered by filtration, and dissolved in chloroform. The chloroform solution is washed repeatedly with water, dried over sodium sulfate, and evaporated under reduced pressure to give an oil, which crystallizes upon addition of methanol, to give approximately 100 g. of 3-acetoxy-17-acetamido-pregn-5-ene.

EXAMPLE 2

A mixture of 75 g. of 3-acetoxy-17-acetamido-pregn-5-ene, 75 g. of potassium bicarbonate, 1250 ml. water and 2250 ml. of ethanol is heated under reflux for a period of approximately 15 hours. Ethanol is evaporated from the reaction mixture under reduced pressure until a precipitate appears, and water is then added to complete the precipitation. The precipitated material is recovered by filtration, washed with water, and dried to give about 68 g. of 3-hydroxy-17-acetamido-pregn-5-ene; m.p. 268°–271°C.

EXAMPLE 3

To a solution containing 50 g. of 3-hydroxy-17-acetamido-pregn-5-ene, 250 ml. of cyclohexanone and 1500 ml. of benzene, which has been dried by distilling the water-containing-azeotrope therefrom, is added approximately 30 g. of aluminum isopropoxide. The resulting mixture is heated under reflux for a period of about 3 hours. The reaction solution is cooled, approximately 1 liter of saturated Rochelle salt solution is added and the resulting buffered mixture is steam distilled until substantially no cyclohexanone remains in the reaction mixture. The resulting mixture is extracted with chloroform, the chloroform extract is washed with water, dried over sodium sulfate, and evaporated under reduced pressure to give 17-acetamido-androst-4-ene-3-one. In accordance with the foregoing procedure but utilizing 3-hydroxy-17-formamido-androst-5-ene or 3-formyloxy-17-formamido-androst-5-ene in place of the 3-hydroxy-17-acetamido-androst-5-ene there employed, there is obtained 17-formamido-androst-4-ene-3-one.

EXAMPLE 4

A solution containing 45 g. of sodium hydroxide dissolved in 150 ml. of water is added to a solution of 5 g. of 3-hydroxy-17-acetamido-androst-5-ene in approximately 350 ml. of ethanol. The resulting mixture is heated in a nitrogen atmosphere under pressure in an autoclave at a temperature of about 180°C. for a period of approximately 8 hours. The reaction mixture is filtered through supercel, and the cream colored solution is evaporated in vacuo until a syrup remains. Water is added to this residual syrup, and the aqueous mixture is extracted with chloroform. The chloroform solution is washed with water, and to the resulting chloroform solution is added a 2.5N. solution of hydrogen chloride in chloroform. The material which precipitates is recovered by filtration, washed with chloroform, then with acetone, and dried to give approximately 4 g. of 3-hydroxy-17-amino-androst-5-ene hydrochloride. The latter compound is heated at a temperature of about 80°–95°C. with a mixture of one equivalent of sodium formate and excess 88 percent aqueous formic acid. The reaction mixture is diluted with water, and then crystalline material which precipitates is recovered by filtration and dried to give 3-formyloxy-17-formamido-5-ene.

EXAMPLE 5

A mixture of about 4.5 g. of 17-acetamido-androst-4-ene-3-one, 4.5 g. of dichloro-dicyano-benzoquinone and 90 ml. of dioxane are heated under a nitrogen atmosphere for a period of approximately 3 hours. The reaction solution is cooled, ethyl acetate is added to ensure solution of the desired reaction product, and the resulting solution is filtered free of unwanted solid material. The filtered reaction solution is washed within aqueous sodium hydroxide solution, then with water, dried over sodium sulfate and evaporated to dryness under reduced pressure while maintaining the temperature of the solution below about 40°C. The residual material is purified by chromatography on aluminum oxide using chloroform and ether mixtures as eluants, to give approximately four grams of substantially pure 17-acetamido-androst-1,4-diene-3-one; m.p. 270°–272°C.

In accordance with the foregoing procedure, but utilizing 17-formamido-androst-4-ene-3-one in place of the 17-acetamido-androst-4-ene-3-one there employed, there is obtained 17-formamido-androsta-1,4-diene-3-one.

Various changes and modifications may be made in carrying out the present invention without departing from the spirit and scope thereof. Insofar as these changes and modifications are in the purview of the annexed claims, they are to be considered as part of this invention.

What is claimed is:

1. An androgen biosynthesis inhibitory composition, effective in the control of acne, comprising a 3-oxygenated-17-acylamido steroid having the following formula:

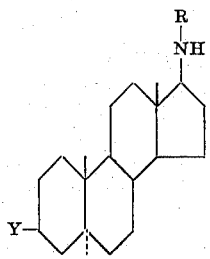

and $\Delta^4$-dehydro and $\Delta^{1,4}$-bis-dehydro derivatives thereof; wherein R is acetyl or formyl; and Y is (a) hydroxy or acetoxy in the case of androstanes, or (b) keto in the case of $\Delta^4$-androstenes and $\Delta^{1,4}$-androstadienes; in admixture with a pharmacologically-acceptable carrier.

2. An anti acne composition as defined in claim 1 in which the 3-oxygenated-17-acylamido-steroid is 17-acetamido-androst-4-ene-3-one.

3. An anti acne composition as defined in claim 1 in which the 3-oxygenated-17-acylamido-steroid is 17-acetamido-androsta-1,4-diene-3-one.

4. An anti acne composition as defined in claim 1 in which the 3-oxygenated-17-acylamido-steroid is 3-hydroxy-17-acetamido-androstane.

5. An anti acne composition as defined in claim 1 in which the 3-oxygenated-17-acylamido-steroid is 3-acetoxy-17-acetamido-androstane.

6. An anti-acne composition as defined in claim 1 in which the 3-oxygenated-17-acylamido steroid is 17-formamido-androsta-1,4-diene-3-one.

7. An anti acne composition as defined in claim 1 in which the 3-oxygenated-17-acylamido-steroid is 17-formamido-androst-4-ene-3-one.

* * * * *